United States Patent
Saito et al.

[19]

[11] Patent Number: 5,867,824
[45] Date of Patent: Feb. 2, 1999

[54] WORKFLOW METHOD AND SYSTEM THEREFOR

[75] Inventors: Takashi Saito, Koube; Shunsuke Akifuji, Wakou; Hiroshi Tsuji, Itami; Hiroshi Majima, Yokohama; Tetsuji Toge, Koube, all of Japan

[73] Assignee: Hitachi, Ltd., Tokyo, Japan

[21] Appl. No.: 546,912

[22] Filed: Oct. 23, 1995

[30] Foreign Application Priority Data

Oct. 26, 1994 [JP] Japan .................................. 6-262208

[51] Int. Cl.[6] .................................................. G06F 17/60
[52] U.S. Cl. ........................... 705/9; 380/23; 380/25; 395/187.01; 395/200.68; 395/200.69; 395/200.7; 395/200.71; 395/200.72; 395/200.73; 395/200.74; 707/9
[58] Field of Search .................................. 395/207, 209, 395/187.01, 200.68–200.74; 380/23, 25; 705/9; 707/9

[56] References Cited

U.S. PATENT DOCUMENTS 4,503,499  3/1985  Mason et al. .
4,932,026  6/1990  Dev et al. .

FOREIGN PATENT DOCUMENTS

94/18620  8/1994  WIPO .

OTHER PUBLICATIONS

Sandy Kemsley, "The Evolution of Workflow (Electronic Workflow Management Systems)", Computing Canada, v 20, n 4, p. 32, Feb. 16, 1994.

Nina Burns, "Just Go With the (Work)flow", PC Week, v 10, n 47, pp. N5–N6, Nov. 1993.

New Workflow System "Goes Beyond Staffware, Workhorse and Rhapsody", Computergram International, n 1809. Nov. 1991.

Gordon, Martin; In good Form (WordPerfect Informs) (Software Review) (Evaluation); PC User; n213, p55(1), Jun. 16, 1993.

Primary Examiner—Emanuel Todd Voeltz
Assistant Examiner—William N. Hughet
Attorney, Agent, or Firm—Fay Sharpe Beall Fagan Minnich & McKee

[57] ABSTRACT

A workflow system comprising a plurality of workflow subsystems connected to a LAN (Local Area Network), these workflow subsystems being composed of servers and clients, and provides a workflow system which permits an integrated management of the definitions of the business processes placed under decentralized management, through the server managing shipping documents, BPs (Business Processes) describing shipping routes of shipping documents in the subsystem, and business process connection data to connect the BPs.

2 Claims, 10 Drawing Sheets

FIG. 5

| PREVIOUS BP EXIT LOCATION 510 | | NEXT BP ENTRANCE LOCATION 520 | | |
|---|---|---|---|---|
| BP DEFINITION NAME 511 | EXIT NODE NAME 512 | BP DEFINITION NAME 521 | ENTRANCE NODE NAME 522 | SERVER NAME 523 |
| BP DEFINITION 1 | node 5 | BP DEFINITION 2 | node 1 | SERVER B |
| BP DEFINITION 1 | node 6 | BP DEFINITION 3 | node 1 | SERVER C |
| ... | ... | ... | ... | ... |

500 BP CONNECTION TABLE

FIG. 6

| NEXT BP DEFINITION NAME 610 | PREVIOUS BP EXIT LOCATION 620 | |
|---|---|---|
| | BP DEFINITION NAME 621 | SERVER NAME 622 |
| BP DEFINITION 2 | BP DEFINITION 1 | SERVER A |
| ... | ... | ... |

600 SECURITY TABLE (a)

| NEXT BP DEFINITION NAME 610 | PREVIOUS BP EXIT LOCATION 620 | |
|---|---|---|
| | BP DEFINITION NAME 621 | SERVER NAME 622 |
| BP DEFINITION 3 | BP DEFINITION 1 | SERVER A |
| ... | ... | ... |

650 SECURITY TABLE (b)

| PREVIOUS BP EXIT LOCATION 810 | SERVER NAME | 811 |
| | BP DEFINITION NAME | 812 |
| | EXIT NODE NAME | 813 |
| NEXT BP ENTRANCE LOCATION 820 | SERVER NAME | 821 |
| | BP DEFINITION NAME | 822 |
| | ENTRANCE NODE NAME | 823 |
| DOCUMENT DATA | | 830 |

800 DATA STRUCTURE OF THE SHIPPING DOCUMENT

FIG. 10

| PREVIOUS BP EXIT LOCATION 1010 | | NEXT BP ENTRANCE LOCATION 1020 | | |
|---|---|---|---|---|
| BP DEFINITION NAME 1011 | CALL NODE NAME 1012 | BP DEFINITION NAME 1021 | ENTRANCE NODE NAME 1022 | SERVER NAME 1023 |
| BP DEFINITION 4 | node 3 | BP DEFINITION 5 | node 1 | SERVER E |
| . . . | . . . | . . . | . . . | . . . |

1000 BP CONNECTION TABLE

FIG. 11

| PREVIOUS BP EXIT LOCATION 1110 | | NEXT BP ENTRANCE LOCATION 1120 | | | RETURN NODE NAME IN THE PREVIOUS BP 1130 |
|---|---|---|---|---|---|
| BP DEFINITION NAME 1111 | CALL NODE NAME 1112 | BP DEFINITION NAME 1121 | EXIT NODE NAME 1122 | SERVER NAME 1113 | |
| BP DEFINITION 4 | node 3 | BP DEFINITION 5 | node 2 | SERVER E | node 4 |
| BP DEFINITION 4 | node 3 | BP DEFINITION 5 | node 3 | SERVER E | node 5 |
| . . . | . . . | . . . | . . . | . . . | . . . |

1100 BP RETURN TABLE

1400 DATA STRUCTURE OF THE SHIPPING DOCUMENT

WORKFLOW METHOD AND SYSTEM THEREFOR

BACKGROUND OF THE INVENTION

1. Field of the Invention

The present invention relates to the workflow system which creates BP (business process) definitions describing the shipping routes and automates the circulation of the electronic documents by referring thereto, and in particular to the workflow method and its system which determine the destinations of the electronic documents to be delivered to a plurality of sites, by coordinating the BP definitions describing the shipping routes within the sites when the electronic documents are to be delivered to a plurality of sites.

2. Description of the Prior Art

With the progress in office automation of the clerical works in recent years, attention has been drawn to the workflow system which provides an effective circulation of electronic documents among the personnel concerned. The workflow systems supporting joint works by groups of people are disclosed in "The Nikkei Computer" (May 2, 1994, Vol. 336, pp. 57 to 67). Workflow systems are also mentioned in the U.S. Pat. No. 4,503,499 "Controlled Workflow System", U.S. Pat. No. 4,932,026 "Apparatus for Distributing Data Processing across a Plurality of Loci of Control", and Japanese Patent Laid-Open 4-77030 (1992) "Electronic mail circulation method and the system thereof". According to U.S. Pat. No. 4,503,499, the electronic shipping documents are restricted to those stored in one server; it does not disclose a system to deliver the electronic documents stored in a plurality of servers. The U.S. Pat. No. 4,932,026 and Japanese Patent Laid-Open 4-77030 (1992) do disclose the system to deliver the electronic documents stored in a plurality of servers, with following restrictions:

(1) The shipping route must have been determined when the electronic document is created.

(2) To modify the shipping route in the middle, the user is required to modify the shipping route on an interactive basis, using the route editor.

In the prior art workflow method, the managing people of the workflow method have described the entire business process as one BP process.

This method has the advantages of:

(1) creating BP definitions featuring a high degree of completeness; and (2) ensuring easy BP definition management; whereas it has the disadvantages that:

(1) those creating the BP definitions are required to have the entirety of the business process to be defined; and (2) the BP definition managing people are different from those executing the business process described by the BP definition, failing to ensure timely maintenance of the BP definition in conformity to the execution.

In the large-scale workflow system, the business process to be defined is also large-sized, making it difficult for any person to understand it. Furthermore, there are a plurality of sites where the business process is executed, making it impossible for one person to manage all BP definitions. Thus, in large-sized workflow systems, it is preferred to make decentralized management of the BP definitions at a plurality of sites, and to deliver the electronic documents through coordination of these management works.

SUMMARY OF THE INVENTION

To solve said problems, the object of the present invention is to provide a workflow method and system therefor, which provide an effective circulation of the electronic documents, despite decentralized management of the BP definition. Namely, the object of the present invention is to provide achieve the following functions of:

(1) ensuring circulation of the electronic documents decentralized in a plurality of sites by coordinating a plurality of BP definitions placed under decentralized management;

(2) ensuring the compatibility of the connection interfaces for a plurality of BP definitions placed under decentralized management when creating BP definitions; and (3) providing the security function for coordination of BP definitions, thereby avoiding disturbance due to connection of illegal BP definitions.

To achieve these targets, the present invention relates to the workflow method and system therefor in the system which delivers the electronic documents to a plurality of terminals, and is characterized in that it (1) generates at least one business process definition describing the entrance and exit of the shipping route of said electronic documents, and the shipping route for the terminals between said entrance and said exit; and (2) moves along the shipping route, based on the BP connection data showing the connection relationship from the exit of at least one generated business process definition to the entrance of one of the local and remote business process definitions.

Furthermore, the present invention relates to the workflow method and system therefor in the system where electronic documents are delivered to the transmission line connected with a plurality of subsystems and to a plurality of terminals inside said plurality of subsystems, with a plurality of servers connected.

In at least two of the first and second subsystems in said subsystems, the present invention (1) generates at least one business process definitions describing the shipping route with respect to the entrance and exit of the shipping route of said electronic documents and also describing the shipping route of the terminals leading from said entrance to said exit, (2) stores inside said first subsystem the BP connection data to link among the business process definitions inside the first and second subsystems, and (3) delivers the electronic documents from said first subsystem to the terminals inside said second subsystem, based on said BP connection data.

To be more specific, according to the present invention, the BP definition describing the shipping route of the electronic document is provided with the information specifying the entrance and exit for circulation, and the entrance and exit of mutually differing BP definitions are linked. Furthermore, according to the present invention, the BP definition is provided with a call-out port and return port in addition to the entrance and exit, and the call-out port and entrance, and exit and return port of the mutually differing BP definitions are respectively connected. In the present invention, BP definitions created by the user in one batch are divided to generate a plurality of connectable BP definitions, which are delivered to each management site. In the present invention, furthermore, a template of the connectable BP definition is created from the newly created BP definition, and is stored as a basis to create the next BP definitions.

Moreover, the present invention has the BP definition provided with BP connection securities.

Based on the configuration mentioned above, the present invention has the effects and following functions:

The entrance and exit of the BP definition are linked, and the call-out port and entrance, and exit and return port are connected respectively. Circulation of electronic documents is implemented by coordination of the BP definitions describing the business processes inside said sites placed under decentralized management in each site. Furthermore, BP definitions created by the user in one batch are divided to generate a plurality of connectable BP definitions, which are delivered to each management site. A template of the connectable BP definition is created from the newly created BP definition, and is stored as a basis to create the next BP definitions, thereby solving the problems of compatibility involved in the connection interface when connecting the BP definitions placed under decentralized management. The present invention, moreover, ensures security which has been a problem in connecting the BP definitions placed under decentralized management.

The foregoing and other objects, advantages, manner of operation and novel features of the present invention will be understood from the following detailed description when read in connection with the accompanying drawings.

BRIEF DESCRIPTION OF THE DRAWINGS

FIG. 5 is a drawing illustrating the BP connection table as one of the BP connection data in the present embodiment;

FIG. 6 is a drawing illustrating the security table as one of the BP connection

FIG. 10 is a drawing illustrating the BP connection table as one of the BP connection data in the present embodiment;

FIG. 11 is a drawing illustrating the BP return table as one of the BP connection

DETAILED DESCRIPTION OF PREFERRED EMBODIMENTS (Embodiment 1)

Figure 1:
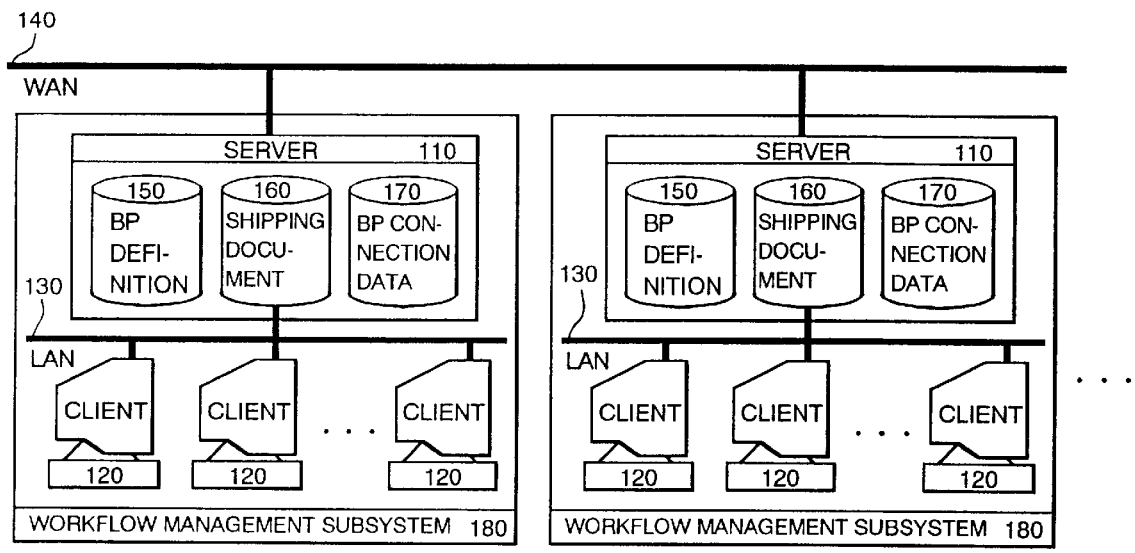
FIG. 1 is a drawing illustrating an embodiment of the configuration of the workflow system according to the present invention.

FIG. 1 is a system configuration drawing illustrating an embodiment of the workflow system according to the present invention; In the system shown in the drawing, a workflow subsystem (180) comprising a server (110) and a plurality of clients (120) is connected to a plurality of WAN (Wide Area Network) (140). When the workflow subsystem is connected to the WAN as shown in this example, each workflow subsystem represents a locally decentralized business establishment such as Tokyo Office and Osaka Office.

Figure 2:
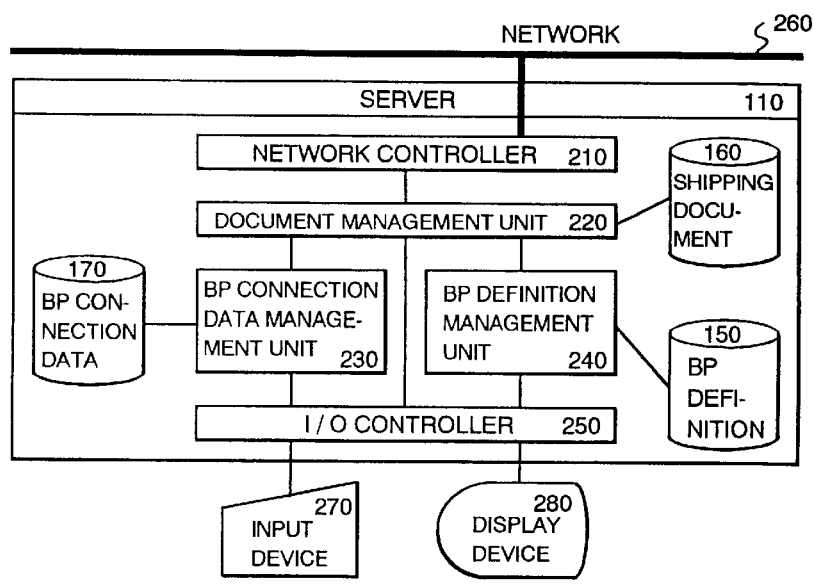
FIG. 2 is a drawing illustrating an embodiment in the block diagram representing the workflow server according to the present invention.

When each workflow subsystem represents a functional division such as Labor Section or Material Procurement Section, each workflow subsystem is a LAN (Local Area Network), not WAN. Where there are a great number of clients (120) contained in the workflow subsystem (180), a plurality of the servers (110) are used to decentralized the loads. The following three types of information are managed by the server (110) included in the workflow subsystem (180):

(1) BP definition (150) describing the shipping route of the electronic document to be circulated in the workflow subsystem (2) BP connection data (170) used to connect between BP definitions (3) Shipping document (160) being delivered in the workflow subsystem FIG. 2 is a drawing related to the processing block constituting the server (110). The following describes the server (110) processing element in the first place.

The network control unit (210) provides communications control through the network between the clients (120) inside a workflow subsystem (180) and the sever (110) of the remote workflow subsystem (180). In the communications with the clients (120), information on the shipping document (160) and delivery conditions of the shipping document (160) is sent to the clients (120) at the request from the clients (120). In the communications with the server (110) inside the remote work workflow subsystem (180), the shipping document (160) is sent to the remote server (110) at the request from the document management unit (220). Receiving the shipping document (160) sent from the server (110) in the remote workflow subsystem (180), it transfers it to the document management unit (220).

The document management unit (220) manages the shipping document (160) and the next BP location described in the BP definition (150) by associating them, and executes preprocessing to transmit the shipping document (160) to the remote server (110), by referring to the BP connection data (170). The BP connection data management unit (230) and the BP definition management unit (240) manage the BP connection data (170) created by the user and the BP definition (150), respectively, and execute retrieval process at the retrieval request, thereby notifying other processing units of the retrieved result. Receiving input from the user via the input device (270), the input/output control unit (250) issues processing request to the document management unit (220), the BP connection data management unit (230) or the BP definition management unit (240), or displays on the display device (280) the processed result obtained from the document management unit (220), the BP connection data management unit (230) or the BP definition management unit (240).

Figure 3:
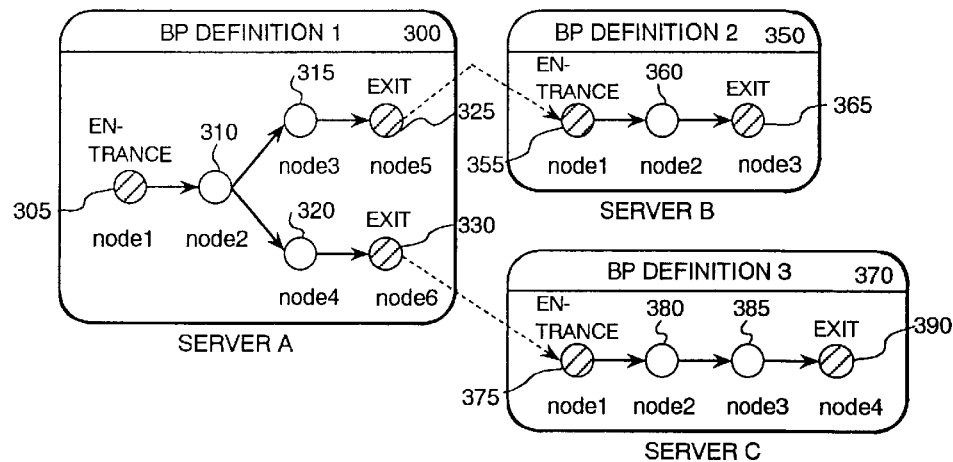
FIG. 3 is a schematic drawing representing the connection of the BP definition used to illustrate the present embodiment.

The following describes the Embodiment 1 with reference to the operation example illustrated in FIG. 3: FIG. 3 is a schematic illustration showing that the BP definition 1 (300), the BP definition 2 (350) and the BP definition 3 (370) managed independently server A, server B and server C are connected with one another. In FIG. 3, the BP definition (150) is described in the data flow model, and the next BP location and the shipping route are described by the node and arc, respectively. One BP definition (150) contains the entrance node and exit node, in addition to the processing node representing one process to be treated in the workflow subsystem (180) to which the BP definition managing server (110) pertains. The entrance node is a node to execute process of receiving the data from other BP definitions, while the exit node is a node to execute process of transmitting the data to other BP definitions. The entrance and exit nodes are the nodes to provide compatibility with other BP definitions. According to the BP definition 1, for example, node 2 (310), node 3 (315) and node 4 (320) are processing nodes, and node 1 (305) is an entrance node, while node 5 (325) and node 6 (330) are exit nodes.

Figure 4:
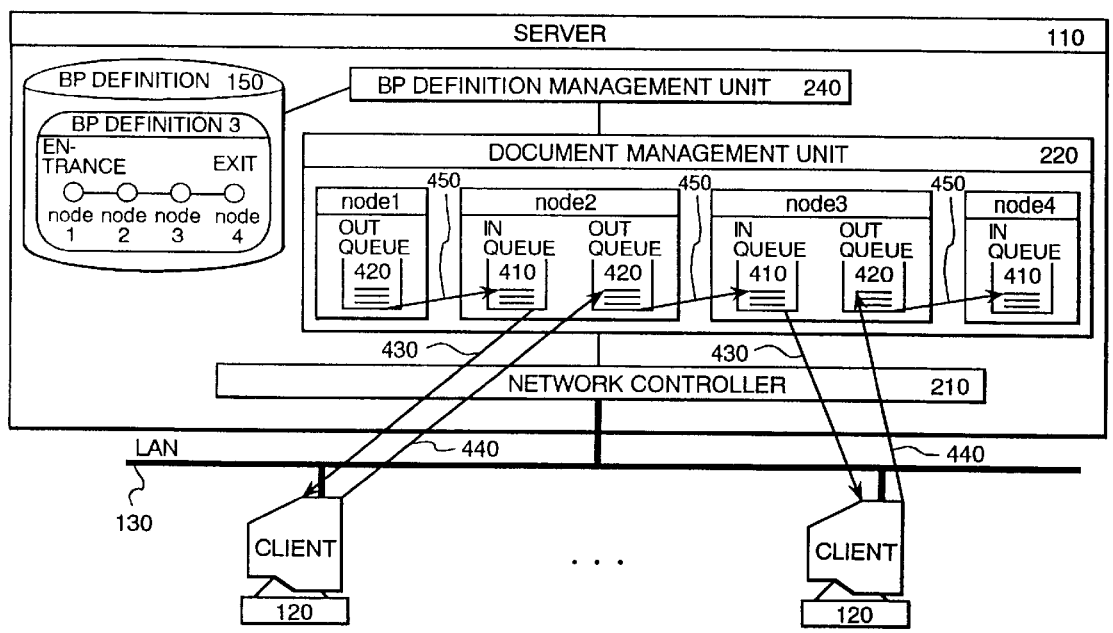
FIG. 4 is a schematic drawing representing the shipping control of the shipping document used to illustrate the present embodiment.

FIG. 4 is a schematic drawing representing the shipping document (160) delivery method in the workflow subsystem (180). The document management unit (220) is provided with the IN queue (410) and OUT queue (420) to enter the shipping documents corresponding to the processing node in the BP definition. The entrance node has only the OUT queue (420), while the exit node has only the IN queue (410). Those in charge of the work on the client (120) and application pick up the shipping document (160) from the IN queue (410) corresponding to the processing node to which they are assigned, and, after executing the process, return it to the OUT queue (420) corresponding to the processing node. Referring to the BP definition (150), the document management unit (220) transfers to the IN queue (410) corresponding to the next processing node the shipping document (160) in the OUT queue (420). The exit node can be linked to the entrance node of other BP definitions (150) by the BP connection data (170). In this case, by making reference to the BP connection data (170), the document management unit (220) transfers to the server (110) managing the BP definition (150) of the next BP location the shipping document (160) of the IN queue (410) corresponding to the exit node.

The BP connection table (500) in FIG. 5 and security tables (600 and 650) in FIG. 6 represent an embodiment of the BP connection data (170) used to connect among the BP definition 1 (300), the BP definition 2 (350) and the BP definition 3 (370). The BP connection table (500) in FIG. 5 are managed by server A, security table (600) in FIG. 6 by server B, and security tables (650) in FIG. 6 by server C. The BP connection table (500) comprises the previous BP exit location (510) composed of the BP definition name (511) and the exit node name (512), and the next BP entrance location (520) composed of the BP definition name (521), the entrance node name (522) and the management server name (523); the information to link between the exit node and entrance node is stored therein. The example of FIG. 3 shows that the exit node node5(325) and node6(330) in the BP definition 1 (300) are linked with entrance node node1 (355) in the BP definition 2 (320) and entrance node node1(375) in the BP definition 3 (370), respectively.

The BP connection table (500) is also used to connect the BP definition (150) which is managed by the same server; in this case, the management server name (523) in the BP connection table (500) can be omitted. The security tables (600 and 650) comprises the next BP definition name (610), and the previous BP exit location (620) composed of BP definition name (621) and management server (622); the information to apply security to the connection of the BP definition (150) is stored therein. According to the security table (a) (600) in FIG. 6, the BP definition 2 (350) allows the connection from the BP definition 1 (300) managed by server A, while according to the security table (b) (650), the BP definition 3 (370) allows the connection from the BP definition 1 (300) managed by server A.

Figure 7:
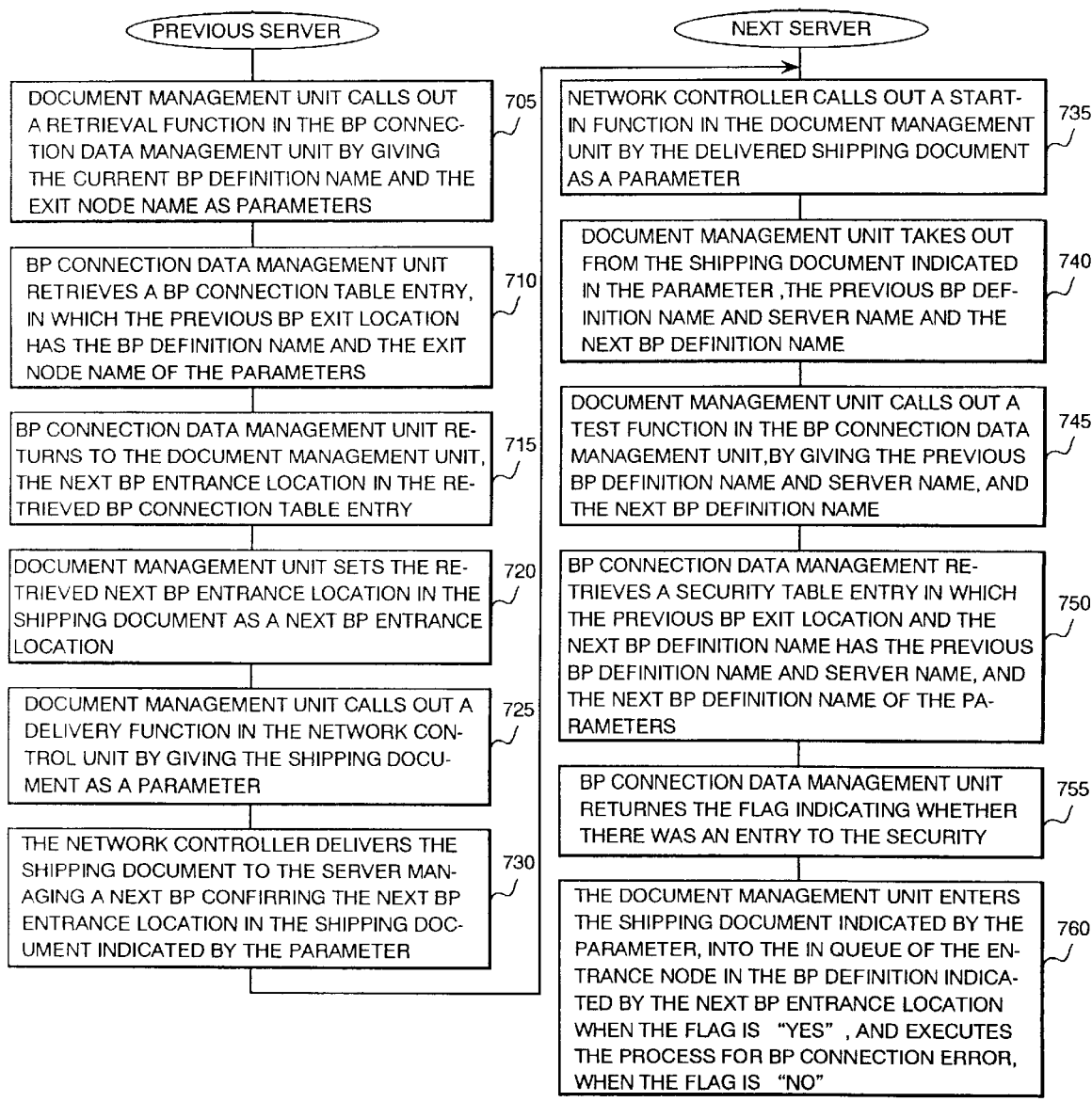
FIG. 7 is a flow chart showing the connection process in the present embodiment.

FIG. 7 is a flowchart representing an example of processing procedures of the previous and next servers when connecting two BP definitions (150) managed by servers (110) pertaining to different workflow subsystems (180), through linkage between the entrance and exit. The flowchart in FIG. 7 uses the shipping document (160) having the data structure shown in FIG. 8. That is, the shipping document (160) has two types of information; information to control the delivery of the shipping document (160) and information on shipping document itself. Information to control the delivery of the shipping document (160) contains the following data:

Previous BP exit location (810) comprising the server name (811), BP definition name (812) and exit node name (813)

Next BP entrance location (820) comprising the server name (821), BP definition name (822) and entrance node name (823)

The following describes the processing procedures for the previous and next servers with reference to the flowchart in FIG. 7. The document management unit (220) gives to the shipping document (160) in the IN queue (410) of the exit node the BP definition (150) where the shipping document (160) is currently present and exit node name, and calls out (750) the retrieval function possessed by the BP connection data management unit (230). The called-out retrieval function searches the entries of the BP connection table (500) where the BP definition name and the exit node name given as parameters have the same value as the previous BP exit location (510) (710); then the next BP entrance location (520) out of the entries of the BP connection table (500) obtained by retrieval is returned to the document management unit (220). And calls the delivery function (821) by giving the shipping document (800) as a parameter (725). The document management unit (220) sets the next BP entrance location (520) obtained from the BP connection data management unit (230) as the next BP entrance location (820) in the shipping document (800) (720). The delivery function delivers the shipping document (160) to a server (110) by referring the server name (821) in the next BP entrance location in the shipping document (160).

The shipping document (160) delivered from the remote server (110) is received by the network control unit (210), and calls out the start-in function of the document management unit (220) by giving that shipping document (160) as a parameter (735). From the shipping document (160) given as a parameter, the start-in function takes out the BP definition name (811) and server name (812) in the previous BP location (810), and the BP definition name (822) in the next BP entrance location (820) (740). It calls out the inspection function of the BP connection data management unit (230) by giving these values as parameters (745). The inspection function searches the entry of the security table (600) having the same value as the BP definition name (822) and the server name (811) given as parameters (750), and returns the flag representing the presence or absence of the corresponding entry to the document management unit (220) (755). When the inspection function has returned the flag indicating presence of the entry, the start-in function stores the shipping document (160) given as a parameter, into the IN queue (410) held by the entrance node in the BP definition specified by the next BP entrance location (820); whereas if the inspection function has returned the flag indicating absence of the entry, connection error process is executed. (Embodiment 2)

Figures 8, 9:
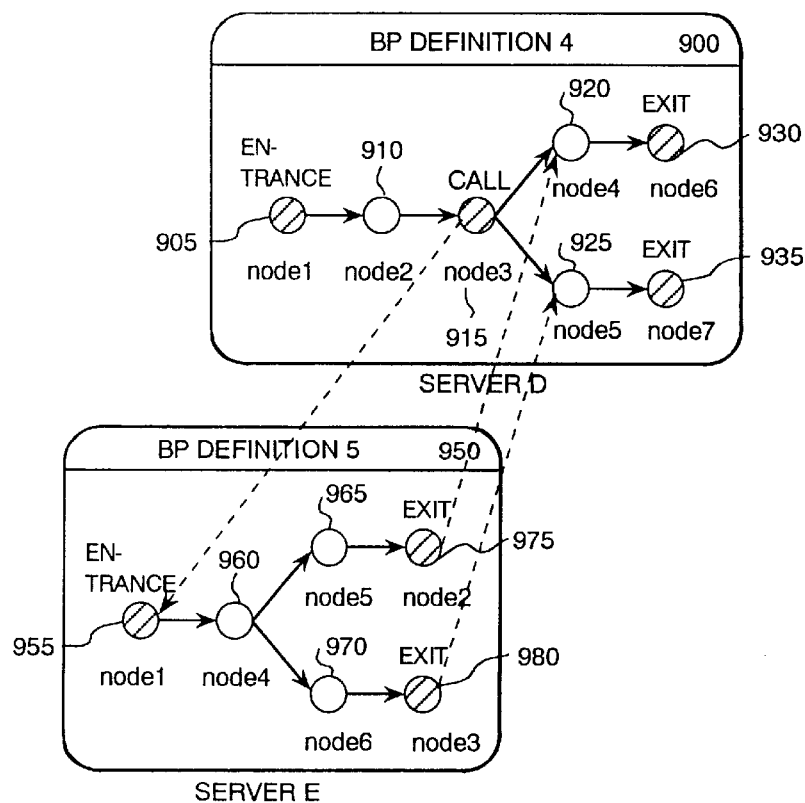
FIG. 8 is a drawing showing the shipping document data structure in the present embodiment.
FIG. 9 is a schematic drawing representing the connection of the BP definition used to illustrate the present embodiment.

The following describes the embodiment 2 according to the present invention with reference to the operation example illustrated in FIG. 9. Embodiment 2 refers to the case of calling out a remote BP definition in the flow of a certain BP definition. FIG. 9 schematically illustrates the connection between the BP definition 4 (900) and BP definition 5 (950) which are independently managed by servers D and E. The BP definition 4 (900) and BP definition 5 (950) in FIG. 9 contain the CALL node in addition to the process node, entrance node and exit node. The shipping document (160) delivered from the CALL node to the process node in the remote BP definition (150) returns to the CALL node again after having completed delivery of the shipping document (160) according to the BP definition (150) as a source of the delivery.

In FIG. 9, for example, the BP definition 5 (950) is called out of the CALL node3 (915) of the BP definition 4 (900). In the BP definition 5 (950), after the document has been delivered from the entrance node (955) up to two exit nodes (975 and 980), it is again returned to the BP definition 4 (900). The shipping document from two exit nodes (975 and 980) are output from the CALL node (915); then the shipping document is delivered to the next nodes (920 and 925) in the BP definition 4.

The BP connection table (1000) in FIG. 10 and BP return table (1100) in FIG. 11 represents the examples of the BP connection data (170) used to connect between the BP definition 4 (900) and BP definition (950). The BP connection table (1000) in FIG. 10 and BP return table (1100) in FIG. 11 are managed by the server D.

The BP connection table (1000) in FIG. 10 consists of;
(1) the previous BP exit location (1010) comprising the BP definition name (1011) and CALL node name (1012), and
(2) the next BP entrance location (1020) comprising the BP definition name (1021), entrance node name (1012) and server name (1023);
and stores information to send the shipping document (160) having reached the exit node of the BP definition (150) managed by the local server to the entrance node of the BP definition (150) managed by the server (110) inside the remote workflow subsystem (180). According to the example in FIG. 10, the CALL node3 (915) in the BP definition 4 (900) managed by the server D is linked to the entrance node1 (955) in the BP definition 5 managed by the server E.

The previous BP exit location (1110) in FIG. 11 consists of: (1) the BP return table (1100) comprising the BP definition name (1111) and CALL node name (1112);
(2) the next BP entrance location (1120) comprising the BP definition name (1121), exit node name (1112) and server name (1123); and
(3) the previous return node name (1130);
and stores the information to enter the shipping document (160) returned from the remote server (110) into the BP definition (150) return node. In the example given in FIG. 11, it stores the information that each of the shipping documents (160) returned from the node2 (975) and node3 (980) in the BP definition 5 (950) managed by server E to the node3 (915) in the BP definition 4 (900) managed by server D, is to be transmitted to the next node4 (920) and node5 (925).

Figure 12:
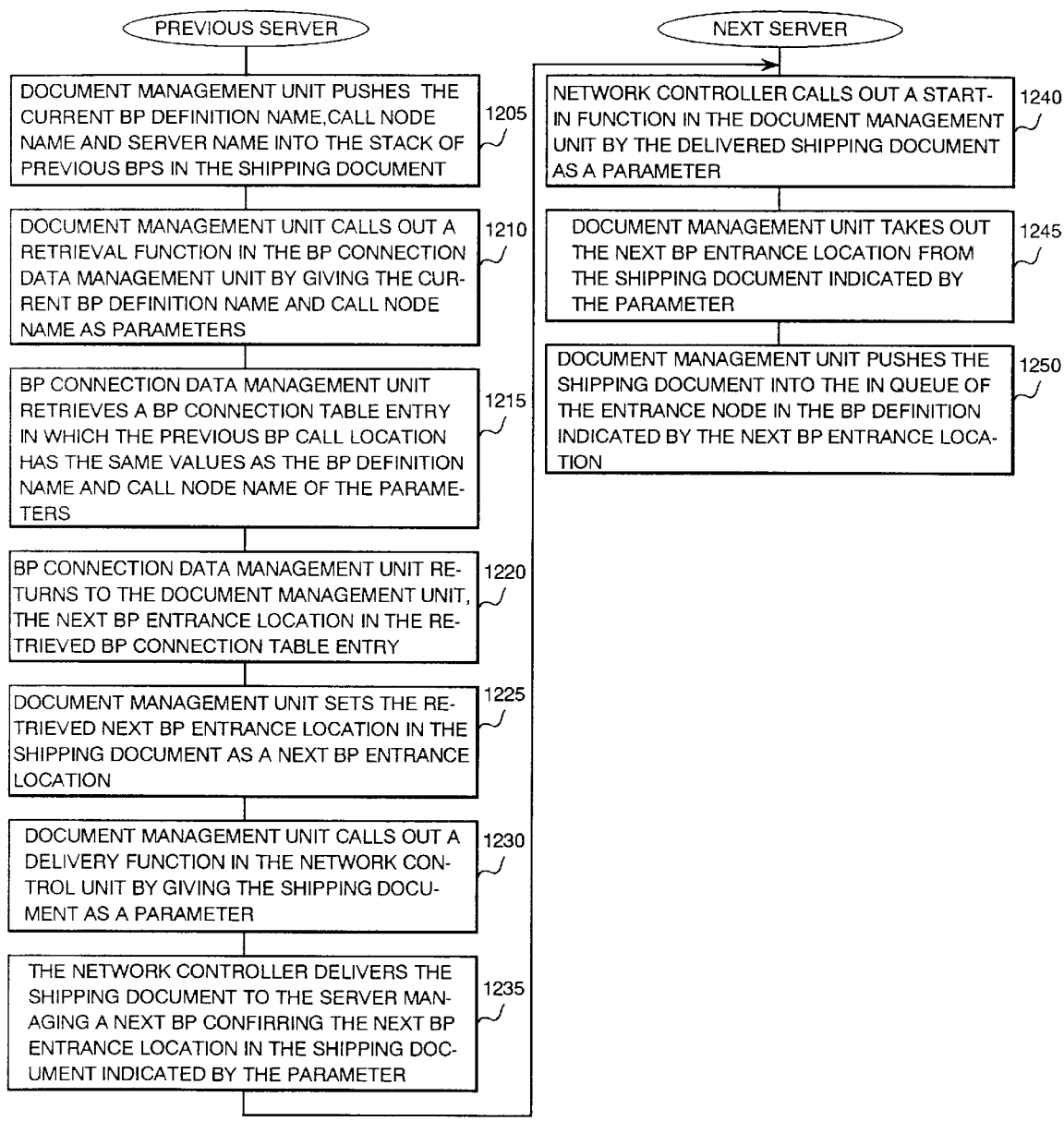
FIG. 12 is a flow chart showing the connection process in the present embodiment.
Figure 13:
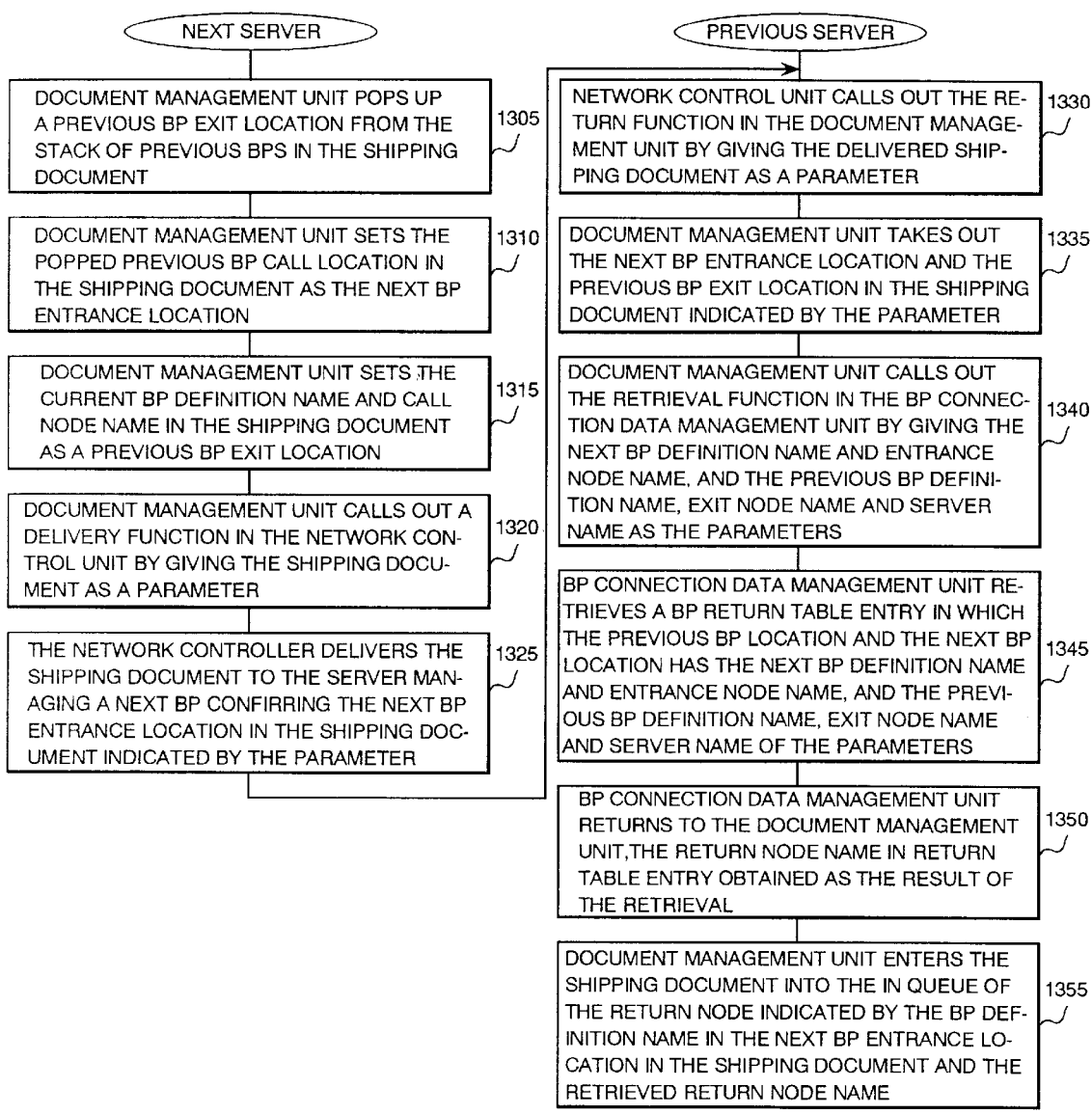
FIG. 13 is a flow chart showing the connection process in the present embodiment.
Figure 14:
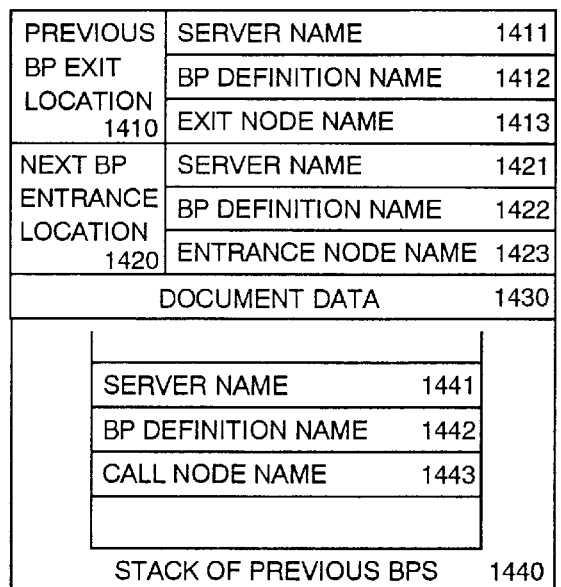
FIG. 14 is a drawing showing the shipping document data structure in the present embodiment.

FIGS. 12 and 13 are flowcharts illustrating an example of the previous server and next server processing procedures to link two BP definitions (150) managed by the servers (110) pertaining to different workflow subsystems (180) between the CALL node and the entrance node, and between the exit node and the return node, respectively. The flowcharts in FIGS. 12 and 13 use the shipping document (160) having a data structure shown in FIG. 14. Namely, the shipping document (160) contains two types of information: information to control the delivery of the shipping document (160) and information on the shipping document (160) itself. Information to control the delivery of the shipping document (160) contain the following data:

Previous BP exit location (1410) comprising the server name (1411), BP definition name (1412) and exit node name (1413)

Next BP entrance location (1420) comprising the server name (1421), BP definition name (1422) and entrance node name (1423)

Previous BP call location management stack (1440) using the server name (1441), BP definition name (1442) and call node name (1443) as one stack entry The following describes the procedure to deliver the shipping document from the previous BP exit location to the next BP entrance location, with reference to the flowchart in FIG. 12: With respect to the shipping document (160) in the IN queue (410) of the CALL node, the document management unit (220) of the present server pushes into the stack of the previous BP call location in the shipping document (1400) the BP definition (150), CALL node name and server name where the shipping document (160) is present. Then the document management unit (220) calls out the retrieval function of the BP connection data management unit (230) by giving as parameters the BP definition name and CALL node name where the shipping document (160) is present. The called retrieval function searches the entry of the BP connection table (1000) where the BP definition name and exit node name given as parameters have the same values as the BP connection data (170) (1020); then the previous BP entrance location (1020) of the BP connection table (1000) obtained by retrieval is returned to the document management unit (220).

The document management unit (220) sets the next BP entrance location (1020) gained from the BP connection data management unit (230) as the next BP location (1420) of the shipping document (1400) (1225), and calls out the distribution function of the network control unit (210) by giving the shipping document (160) to the parameter. Referring to the server name (1420) of the next BP location in the shipping document (1400), the distribution function sends the shipping document (160) to the corresponding server (110).

After the shipping document (160) sent from the remote server (110) is received by the network control unit (210), the start-in function of the document management unit (220) is called out by giving the shipping document (160) as a parameter (1240). The start-in function takes out the next BP location (1420) from the shipping document (160) given as parameter (1245); then the shipping document (160) is stored in the IN queue (410) of the entrance node in the BP definition (150) specified by the next BP location (1420) (1250).

With reference to the flowchart in FIG. 13, the following describes the procedure to return the shipping document (160) from the next server to the previous server: The document management unit (220) of the next server pops the previous BP call location (1441, 1442 and 1443) from the stack of previous BP call location (1440) of the shipping document (1400), and set the previous BP call location as the next BP location (1420) of the shipping document (1400) (1310). Then the document management unit (220) sets as the previous BP location (1410) the BP definition name (159) and exit node name where the shipping document (160) is present (1315), and calls out the distribution function of the network control unit (210) by giving the shipping document (160). Referring to the server name (1421) of the next entrance location (1420) in the shipping document (1400) given as parameter, the network control unit (210) delivers the shipping document (160) to the server of the next BP entrance location (1325).

The shipping document (160) delivered from the remote server (110) received by the network control unit (210) to call out the return function of the document management unit (220) by giving the shipping document (160) as a parameter (1330). The return function takes out the next BP entrance location (1420) and the previous BP exit location (1410) from the shipping document (160) given as a parameter (1335). They are given as parameters to call out the retrieval function of the BP connection data management unit (230) (1340). The return retrieval function searches the entry of the BP return table (1100) to which the previous BP entrance location (1410) and the next BP exit location (1420) given as parameters are applicable (1345), thereby returning the return node name (1130) in the entry to the document management unit (220). The return function places the shipping document into the IN queue (410) of the node which is specified by the return node name (1130) returned by the return retrieval function, and which is specified by the BP definition name (1422) of the next BP entrance location in the shipping document (1400) (1355).

Embodiment 3

When connecting the BP definitions created independently on a plurality of servers by a plurality of users, incompatibility problems are likely to occur to the connection interfaces among the BP definitions. Embodiments 3 and 4 illustrate how to provide support to adjust the connection interfaces.

When an end user has created one business process as one BP definition (150) and registered it in the server (110), the server (110) divides the BP definition (150) to create a plurality of BP definitions, which are delivered to the management server (110). The following describes this procedure as Embodiment 3. Embodiment 3 shows the case where the end user creates the BP definition (1500) shown in FIG. 15 and registers it into the server (110). The processing node of the BP definition (1500) shown in FIG. 15 contains the user to execute the process represented by the processing node and the name of the server for that user, in addition to the node name. The BP definition management unit (240) divides the processing node under BP definition into several groups, according to the grouping rules introduced below:

If the same server is used by those executing the process in the processing node connected by an arc, their processing nodes pertain to the same group.

If different servers are used by those executing the process in the processing node connected by an arc, their processing nodes pertain to different groups.

Figure 15:
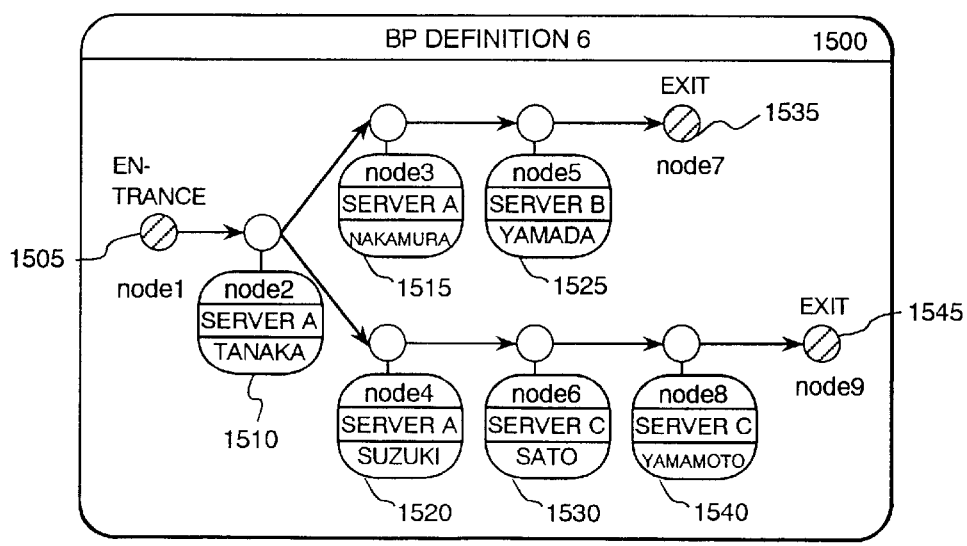
FIG. 15 is a drawing showing the BP definition used to illustrate the present embodiment.

According to the above rule, the processing node in the BP definition (1500) shown in FIG. 15 is divided into three groups; (1) 1st group comprising node2 (1510), node3 (1515) and node4 (1520), (2) 2nd group comprising node5 (1525) alone, and (3) 3rd group comprising node6 (1530) and node8 (1540).

Next, to create one BP definition (150) for each group, the BP definition management unit (240) provides an addition of the entry node and exit node according to the grouping rules introduced below:

If an arc has no initial node in a graph comprising the processing node pertaining to a group and the arcs coming in and out of that processing node, add the entrance node to the initial position of that arc.

If an arc has no terminal node in a graph comprising the processing node and the arcs coming in and out of that processing node, add the exit node to the terminal position of that arc.

FIG. 3 illustrated above shows three BP definitions which are gained by dividing FIG. 15. Furthermore, the BP definition management unit (240) creates the BP connection data (170) to link between the exit and entrance nodes added to connect the BP definition (150) obtaining by division. FIGS. 5 and 6 show the BP connection data (170) created by the BP definition management unit (240) to connect three BP definitions after the division shown in FIG. 3. Lastly, the BP definition (180) created by division and the BP connection data (170) to connect them are put together for each management server to create a system document. The system document is a special document used by the workflow subsystem for operation.

When the BP definition management unit (240) gives the system document as a parameter to call out the start-in function of the document management unit (220), the document management unit (220) delivers the system document according to the setup BP definition. The setup BP definition describes shipping order of system documents, and that the setup BP definition is generated while the workflow system is operated, thereby executing the work required for workflow system operation by delivering the system document according this definition. In the above example, three system documents are created; (1) a system document comprising the BP definition 1 (300) and BP connection table (500), (2) a system document comprising the BP definition 2 (350) and the security table (a) (600) and (3) a system document comprising the BP definition 3 (370) and the security table (b) (650). These system documents each are sent to servers A, B and C according to the setup BP definition. The system documents sent to the remote server (110) are delivered according to the setup BP definition of that server (110); finally, the BP definition (150) and the BP connection data (170) are managed by the BP connection data management unit (230) of those servers.

Embodiment 4

When the end user has created the BP definition (150) including the CALL node, and has registered it into the server (110), the server (110) creates the template of the BP definition to be connected, according to that BP definition (150), and sends it to the next management server (110). In the next server, the end user creates the BP definition (110) based on the delivered template of the BP definition. This is illustrated in the present Embodiment.

Figure 16:
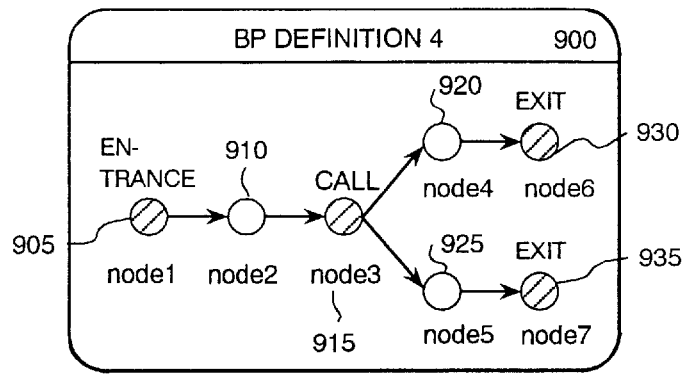
FIG. 16 is a drawing showing the BP definition used to illustrate the present embodiment.
Figure 17:
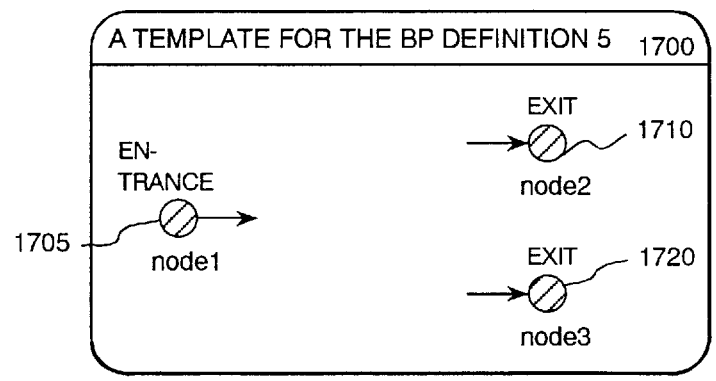
FIG. 17 is a drawing showing the BP definition template used to illustrate the present embodiment.

Assume that the end user has created the BP definition 4 (900) shown in FIG. 16, and has registered it into the server (110). The BP definition 5 (900) shown in FIG. 16 contains a CALL node, and the BP connection table (1000) in FIG. 10 and the BP return table (1100) in FIG. 11 are set in the BP connection data (170) of this CAL1 node. In this case, the BP definition management unit (240) creates the template (1700) of the BP definition as illustrated in FIG. 17. the template (1700) of the BP definition comprises only the entrance and exit nodes linked to the CALL and return nodes. In the template (1700) of the BP definition, the BP definition name, entrance node name and exit node name are assigned with the names specified by the BP connection data (170) of FIGS. 10 and 11.

Next, the BP definition management unit (240) creates a system document containing the BP definition template (1700), and gives it as a parameter to call out the start-in function of the document management unit (220). The document management unit (220) delivers the system document according to the setup BP definition, and sent it to the remote server (110). The remote server (110) delivers the system document according to the setup BP definition of that server (110). By delivering the system document, the user creates the BP definition (150) based on the delivered template of the BP definition. The created BP definition (150) is stored in the BP definition management unit (240).

As discussed above, the present invention allows a plurality of decentralized BP definitions to be connected. This permits the BP definition describing the business process of a site to be managed independently by the site, ensuring easy modification of the BP definition in conformity to the operating conditions. Furthermore, the present invention provides a support for the decentralized management of BP definitions. When the business processes over a plurality of sites are described, the present invention provides an automatic compatibility of the BP definition connecting interfaces.

The invention claimed is:

1. A workflow method in a system delivering electronic documents to a plurality of terminals in a plurality of servers with a transmission line interconnecting said servers, said method comprising:

in each of at least a first server and a second server among said plurality of servers, generating at least one business process definition describing data flow among terminals including an entrance terminal, an exit terminal, and a shipping route of said electronic documents from said entrance terminal to said exit terminal;

inside said first server, storing business process connection data which links the business process definition generated inside the first server to the business process definition generated inside the second server;

inside said second server, storing connection security information on the delivery of electronic documents from said first server to said second server;

based on said stored connection security information, determining whether said second server should accept the delivery of electronic documents from said first server.

2. A workflow system for delivery of electronic documents to a plurality of terminals in a plurality of servers, the system comprising:

a transmission line connecting said servers;

in each of at least a first and a second of said servers, means for generating at least one business process definition describing data flow among the terminals including an entrance terminal, an exit terminal, and a shipping route of the electronic documents from said entrance terminal to said exit terminal;

a first storing means for storing business process connection data which links the business process definitions generated inside the first server to another business process definition;

a second storing means for storing business process connection data which links the business process definitions generated inside the second server to another business process definition;

a security information storing means for storing, inside said second server, connection security information on the delivery of electronic documents from said first server to said second server;

a delivery means for delivering the electronic documents from said first server to the terminals inside said second server, based on said business process connection data stored inside said first server; and, a means which uses said stored connection security information for determining whether said second server accepts the delivery of electronic documents from said first server.

* * * * *